Aug. 29, 1950 E. H. ULLRICH 2,520,184

ELECTRICAL WAVE SIGNALING SYSTEM

Original Filed Nov. 8, 1941

Inventor
EDWARD HILL ULLRICH
By [signature]
Attorney

Patented Aug. 29, 1950

2,520,184

UNITED STATES PATENT OFFICE 2,520,184

ELECTRICAL WAVE SIGNALING SYSTEM

Edward Hill Ullrich, London, England, assignor, by mesne assignments, to International Standard Electric Corporation, New York, N. Y., a corporation of Delaware Original application November 8, 1941, Serial No. 418,281, now Patent No. 2,381,847, dated August 7, 1945. Divided and this application June 30, 1945, Serial No. 602,453. In France April 4, 1940

1 Claim. (Cl. 250—6)

The present invention relates to electric wave signalling systems comprising a plurality of transmitters widely spaced so as to be received at a receiving station from different directions. This is a division of U. S. application Serial No. 418,281 filed November 8, 1941 which has since issued into U. S. Patent No. 2,381,847 on August 7, 1945.

The transmitting stations may be radiating on the same wave lengths or on wave lengths which are slightly different from each other, and includes the case in which at a receiver interference is caused purposely in the transmission from one of the transmitters by the transmission from another transmitter, the two transmitters being separated by some distance.

In such a network of radio transmitting stations the fading produced at a receiver will generally be different for the radiations received from the different transmitting stations which will be located in different directions with respect to the receiver.

It is an object of this invention to provide means for increasing the apparent directivity and efficiency of an antenna so oriented that the receiver receives only the desired intelligence wave.

The invention will be exemplified in connection with impulse modulated transmission and with a directional frame antenna at the receiver but it will be understood by those skilled in the art that the invention is applicable to any kind of transmission and any kind of directional antenna at the receiver. For the sake of simplicity it will be assumed that the receiver has a passband of infinite width. A receiver according to the invention comprises a non-directional antenna and a directional antenna such as a frame aerial, each connected respectively to a limiting amplifier. After rectification, the outputs of these amplifiers contain all the pulses except those which come from a direction in which the frame aerial has zero reception. Since the amplifiers contain limiting arrangements, all the pulses will have amplitudes of the same value. The two amplifier detectors are connected in opposition. Thus, only those pulses remain which arrive in the direction of zero reception of the frame aerial. If the pulse is stronger by 6 decibels (db.) than the interference, then the corresponding output will be free from interference.

Figure 1:
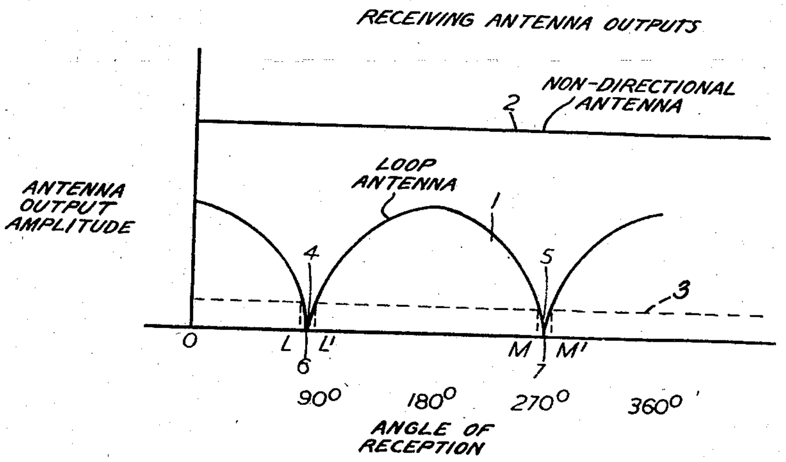
Figure 2:
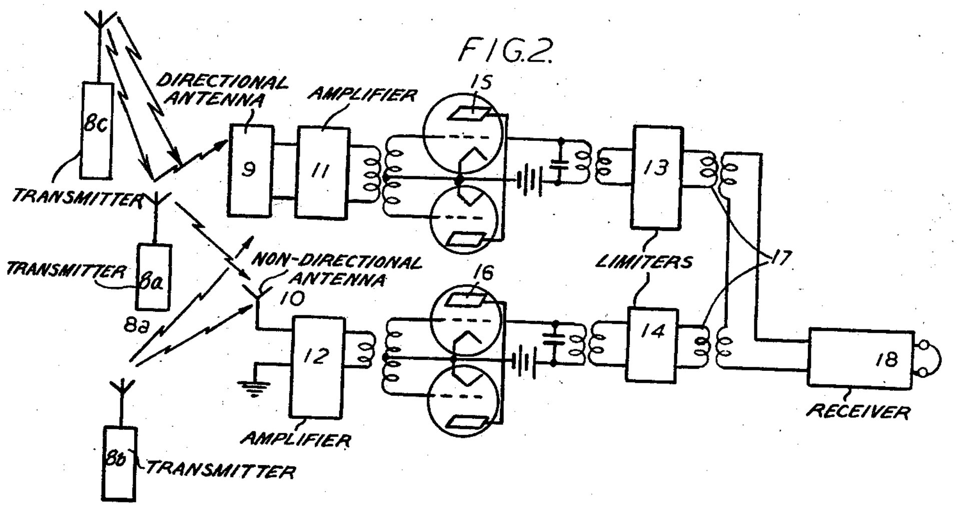

The invention will now be described in relation to the accompanying drawings in which:

Figure 1 illustrates the directional diagrams of a frame and of a non-directional antenna; and Figure 2 represents schematically partially in block schematic, a system according to the invention incorporating a receiver for highly directive reception of a pulse-modulated signal wave.

If signals of the same intensity are received from all directions, then in the output of the frame antenna, the strength of these signals will vary as a function of the angle of the plane of incidence of the waves along curve 1, the intensity of the signals being indicated along the ordinates and the inclination along the abscissa. The strength of the signals in the output of the non-directional antenna is represented by a straight line 2. If, in each case the limiter reduces the intensity of these signals to the value represented by the ordinate 3 then the only signals resulting from connecting the outputs of the two amplifiers in opposition will be those which are included within the angles, such as 4 and 5 in the Figure 1.

It should be noted that the phase of the high-frequency signal leaving the frame antenna changes by 180° at the points 6 and 7. If, therefore, the detectors following the amplifiers were eliminated, then the output of the limiting amplifier of the frame could be connected in opposition between zero and the point 6 with that of the limiting amplifier of the non-directional antenna, but the two output will be additive between points 6 and 7. This disadvantage may be eliminated, e. g. by means of the circuit of the receiver shown in Fig. 2.

In this figure the differently located transmitters are represented by the blocks 8*a*, 8*b*, 8*c*, there being any desired number. The frame or directional aerial is represented at 9 with the non-directional antenna at 10. The antennae 9 and 10 are connected, respectively, to the amplifiers 11 and 12 connected in turn to the limiting devices 13 and 14 through arrangements 15 and 16 which produce outputs independent of the sign of the input wave. Such arrangements may be in the form of two frequency-doubling devices of any well-known type. The outputs of the limiting devices, 13 and 14, are connected to a differential transformer 17 which feeds a receiver 18 adapted to the reception of pulse modulation. Since the arrangements 13 and 14 double the frequency, the receiver 18 must have a corresponding band width.

It will be seen that any directional antenna may be used since the phase of the signal received by any directional antenna changes by 180° in passing through a direction of zero reception.

In order to avoid the production of undesired frequencies by the limiter, it is necessary in principle that all transmitting stations have the same frequency. If a relatively strong wave having frequency F and a weaker wave having a frequency $f$, be applied to a limiter, then in the output of the limiter, not only these two frequencies will be found but also the frequency $F-f$, i. e. the image frequency of the weak wave with respect to the strong wave. Since the intensity of a wave in the output of an antenna depends on the directivity of the latter, it is possible that the stronger wave be different in the outputs of the two antennae. However, this will cause only rarely any disturbance because the impulses are very short and only one signal is present at a time. The invention can, therefore, be usefully applied even where the frequencies of the received messages are different.

Although the invention has been explained as applied to waves modulated by impulses, it need not be limited to such systems, but may be applied to frequency-modulation systems also. In fact, although the image frequencies are not the same in the output of the limiters, it is possible to arrange that the waves of undesired stations are in opposition and to suppress the disturbance by certain image frequencies being less confusing than disturbance by undesired stations.

It will be understood that the invention is not limited to the embodiments herein disclosed but may be modified in many ways without departing from the spirit thereof.

What is claimed is:

A receiving arrangement for receiving energy waves from a plurality of different directions comprising a non-directional antenna and a directional antenna, translating means connected to each of said antennas each comprising a wave frequency doubler circuit and a limiter connected to the output of said doubler circuit, means for combining the outputs of said limiters in phase opposition and detecting means connected to the output of said combining means.

EDWARD HILL ULLRICH.

REFERENCES CITED

The following references are of record in the file of this patent:

UNITED STATES PATENTS

| Number | Name | Date |
|---|---|---|
| 1,468,049 | Taylor | Sept. 18, 1923 |
| 1,702,440 | Hinton | Feb. 19, 1929 |
| 1,839,290 | Bailey | Jan. 5, 1932 |
| 2,104,635 | Breedlove | Jan. 4, 1938 |
| 2,107,633 | Hooven | Feb. 8, 1938 |
| 2,216,517 | Oosterhuis | Oct. 1, 1940 |
| 2,226,836 | Sinninger | Dec. 21, 1940 |
| 2,238,951 | Smith et al. | Apr. 22, 1941 |
| 2,279,466 | Johnske et al. | Apr. 14, 1942 |
| 2,320,908 | Busignies | June 1, 1943 |
| 2,350,702 | Ullrich | June 6, 1944 |
| 2,396,884 | Robinson | Mar. 19, 1946 |
| 2,406,799 | Busignies | Sept. 3, 1946 |

FOREIGN PATENTS

| Number | Country | Date |
|---|---|---|
| 621,731 | France | Nov. 8, 1929 |
| 720,624 | France | Dec. 4, 1931 |